June 28, 1932.   A. LENKTIS   1,864,917

GAS VALVE

Filed Jan. 30, 1931

Adolph Lenktis Inventor

By Attorney

Patented June 28, 1932

1,864,917

UNITED STATES PATENT OFFICE

ADOLPH LENKTIS, OF BROOKLYN, NEW YORK

GAS VALVE

Application filed January 30, 1931. Serial No. 512,243.

This invention relates to gas valves, and has for its object the provision of a safety gas valve applicable to connections between a rubber tubing and a metallic pipe line, or a rubber tubing and a gas appliance, such as a gas stove or gas heater.

It is a common occurrence that rubber tubing connections which form part of a gas line become separated accidentally from the corresponding metallic pipe line. Unfortunately, often the damage is not promptly noticed, with the consequence that the room or rooms where these connections are installed become filled with gas, with consequent danger to human life and property. The newspapers of the larger cities report almost daily such accidents.

The particular feature of the device covered by this invention is that where this device is used, the flow of the gas is automatically arrested immediately after the connection between a metallic pipe line and a flexible tubing or a flexible tubing and a gas appliance is severed, thereby excluding the possibility of an accident.

With the above and other objects in view, this invention consists of the novel features of construction, combination and arrangements of parts, hereinafter fully described, claimed and illustrated in the accompanying drawing forming part of this specification, in which similar characters of reference indicate corresponding parts in all views, and in which:

Figure 1 is a cross sectional view of a gas fitting provided with a safety check valve, the said gas fitting being installed at the end of a pipe line and adapted to receive a flexible tubing.
Figure 2 is the same as Figure 1, with the difference that there is a rubber tubing attached to the said fitting.

Figure 1:
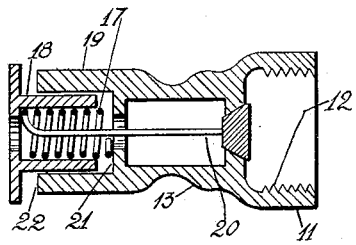
Figure 2:
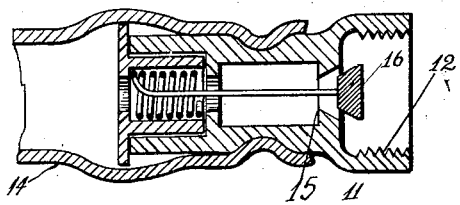

With reference to the foregoing drawing the operation of the device will be understood from the following description:

On Figures 1 and 2 11 is a gas fitting. This fitting is attached to the end of a pipe line by means of its threaded end portion 12, its center part 13 being ribbed for attaching thereto a rubber tubing, 14. There is a valve seat, 15, provided in the said fitting, and a cone-shaped check valve, 16, is pressed against the said seat by a coil spring, 17, the said spring being mounted in a housing or nipple 18, which is slidably mounted in the end portion 19 of the said fitting 11. The stem 20, which in reality is a continuation of the spring 17 provides the connection between the spring 17 and the check valve 16. Shoulder 21 provides a support for the spring 17, and from the construction it is evident that the spring 17 has a tendency to keep the check valve closed, the pressure of the gas inside the pipe line pressing the check valve 16 against its seat.

However, when a rubber tubing, 14, is attached to the said fitting, as illustrated in Figure 2, the housing or nipple 18 will be pressed toward the right, and held there against the face 22 of the fitting 11. The consequent compression of the spring 17 will raise the check valve 16 off its seat, thereby permitting free flow of the gas from the pipe line into the flexible tubing 14. If, however, the flexible tubing 14 becomes separated from the fitting 11, the pressure of the spring 17 will cause the check valve 16 to be seated on its seat, thereby arresting the flow of gas.

Figure 3:
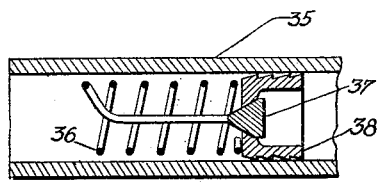
Figure 3 is a cross sectional view of the end portion of a rubber tubing provided with a safety check valve, and presents a modification of my device, as shown in Figs. 1 and 2.
Figure 4:
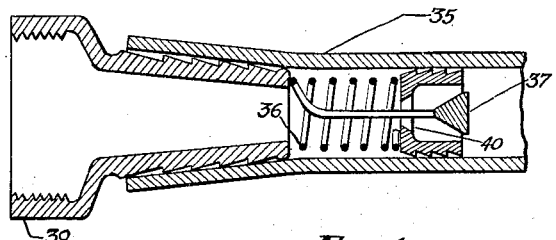
Figure 4 is similar to Figure 3 and also a modification of Figs. 1 and 2, as it shows a gas appliance attached to the aforementioned tubing.

In Figures 3 and 4, 38 represents the body of my safety device. It is provided with a valve seat 40 which accommodates check valve 37, the latter being tightly pressed against the seat 40 by spring 36, as shown on Figure 3. The safety device is shown thrust into the end of a rubber tubing 35, and when there is no gas appliance connected to the said tubing, as shown on Figure 3, the safety device will effectively check the flow of gas. When a nozzle 39 of a gas appliance is connected to the rubber tubing 35, as shown on Figure 4, the spring 36 will be compressed, thereby lifting the check valve 37 off its seat

40. If, however, the rubber tubing is separated from the nozzle of the gas appliance, the condition shown in Figure 3 will return, and the flow of gas will be immediately arrested.

While I have shown and described the preferred embodiment of my invention, it is to be understood that many minor modifications may be resorted to within the scope of the invention, and I do not, therefore, desire to be limited to the precise construction illustrated in the drawing.

Having thus fully described my invention, what I desire to claim and protect by Letters Patent of the United States is:

1. A safety gas device, comprising in combination a metallic pipe-fitting, two intermediate partitions provided with central openings therein, and being arranged in the said pipe-fitting to form open rear and front chambers therewith; the rear partition being formed with a centrally disposed cone-shaped valve seat; a substantially T-shaped member, the stem of the said T-shaped member being provided with a somewhat large central bore and the top-portion of the T-shaped member with a somewhat smaller central opening, thereby forming a shoulder inside the said T-shaped member, a valve, and a valve stem, the latter having one end integrally connected to the said valve and the other end supported by the shoulder of the said T-shaped member, a coiled spring mounted within the bore of the said T-shaped stem, the wing-shaped portions of the T-shaped member being adapted for connection with a rubber tube and made to effect an engagement of the said T-shaped stem and pipe fitting in a fixed position, when the said rubber tube is extended over the said gas pipe-fitting, thereby allowing a free flow of gas.

2. A safety gas device, comprising in combination a metallic pipe-fitting, two intermediate partitions, the outer one of these having a central opening therein, and the inner one being formed with a cone-shaped valve seat, the said partitions being arranged in the said pipe-fitting to form an open rear and an open front chamber therewith; a substantially T-shaped member adapted to partially slide within the said front chamber, the stem of the said T-shaped member being provided with a somewhat large central bore, and the top-portion of the T-shaped member with a somewhat smaller central opening, thereby forming a shoulder inside and near the top of the said T-shaped member, a valve, and a valve stem, the latter having one end integrally connected to the said valve and the other end supported by the shoulder of the said T-shaped member, a coiled spring mounted upon the said valve stem and within the bore of the said T-shaped stem, the latter being of a length substantially equal to the depth of the front chamber; the wing-shaped portions of the T-shaped member being adapted for the attachment of a rubber tube thereto, the said rubber tube being made to overlap the said pipe-fitting, thereby controlling the operation of the device, according to its connection with the T-shaped member alone, or with the latter and the gas pipe-fitting together.

Signed at New York city in the county of New York and State of New York this 26th day of December, A. D. 1930.

ADOLPH LENKTIS.